United States Patent
Le Gallo

(10) Patent No.: US 8,317,986 B2
(45) Date of Patent: Nov. 27, 2012

(54) HIGH TEMPERATURE ELECTROLYSER WITH HYDROGEN RECOVERY DEVICE

(75) Inventor: Patrick Le Gallo, Saint Appolinard (FR)

(73) Assignee: Commissariat a l'Energie Atomique, Paris (FR)

( * ) Notice: Subject to any disclaimer, the term of this patent is extended or adjusted under 35 U.S.C. 154(b) by 180 days.

(21) Appl. No.: 12/678,304

(22) PCT Filed: Sep. 23, 2008

(86) PCT No.: PCT/EP2008/062649
§ 371 (c)(1),
(2), (4) Date: Mar. 16, 2010

(87) PCT Pub. No.: WO2009/040334
PCT Pub. Date: Apr. 2, 2009

(65) Prior Publication Data
US 2010/0200396 A1    Aug. 12, 2010

(30) Foreign Application Priority Data

Sep. 25, 2007  (FR) ..................... 07 57821

(51) Int. Cl.
C25B 9/00  (2006.01)
C25B 1/02  (2006.01)

(52) U.S. Cl. ......... 204/258; 204/242; 204/193; 204/194

(58) Field of Classification Search ................ 204/242, 204/258
See application file for complete search history.

(56) References Cited

U.S. PATENT DOCUMENTS

| | | | | |
|---|---|---|---|---|
| 5,084,156 | A | * | 1/1992 | Iwanaga et al. ............... 204/247 |
| 5,976,346 | A | * | 11/1999 | Freire et al. .................... 205/349 |
| 2007/0105000 | A1 | * | 5/2007 | Chapman et al. ............... 429/38 |
| 2007/0163889 | A1 | | 7/2007 | Kato et al. |

FOREIGN PATENT DOCUMENTS

| | | |
|---|---|---|
| EP | 1 465 278 A2 | 10/2004 |
| EP | 1 465 278 A3 | 10/2004 |

OTHER PUBLICATIONS

J. Stephen Herring, et al., "Hydrogen Production Through High-Temperature Electrolysis in a Solid Oxide Cell", Nuclear Production of Hydrogen, Second Information Exchange Meeting Argonne, Illinois, USA, Nuclear Energy Agency Organisation for Economic Cooperation and Development, XP008090975, Oct. 2-3, 2003, pp. 183-200 with an additional page.

D.K. Ryland, et al., "Electrolytic hydrogen generation using CANDU nuclear reactors", International Journal of Energy Research, vol. 31, XP-002478071, May 21, 2007, pp. 1142-1155.

U.S. Appl. No. 12/678,313, filed Mar. 16, 2010, Le Gallo, et al.

* cited by examiner

Primary Examiner — Harry D Wilkins, III
Assistant Examiner — Zulmariam Mendez
(74) Attorney, Agent, or Firm — Oblon, Spivak, McClelland, Maier & Neustadt, L.L.P.

(57) ABSTRACT

An electrolyser for generating hydrogen including a plurality of elementary electrolysis cells including a cathode, an anode, and an electrolyte provided between the cathode and the anode. An interconnection plate is interposed between the anode of an elementary cell and a cathode of a following elementary cell, in electric contact with the anode and the cathode, and includes a cathodic compartment, an anodic compartment for circulation of fluid to the cathode and the anode respectively, and a chamber for collecting a gas generated at the cathode, separated from the cathodic compartment and the anodic compartment by first and second walls respectively, the first wall at least having a thickness allowing diffusion of the gas through the first wall from the cathodic compartment to the chamber.

8 Claims, 2 Drawing Sheets

HIGH TEMPERATURE ELECTROLYSER WITH HYDROGEN RECOVERY DEVICE

TECHNICAL FIELD AND PRIOR ART

The present invention relates to electrochemical reactors provided with a hydrogen recovery device, particularly electrolysers or fuel cells, and more particularly high temperature electrolysers.

An electrochemical reactor comprises a plurality of elementary cells formed of a cathode and an anode separated by an electrolyte, the elementary cells being electrically connected in series by means of interconnection plates interposed between an anode of an elementary cell and a cathode of the following elementary cell. The interconnection plates are electronically conductive components formed for example of a metal plate. These plates moreover ensure the circulation of the cathodic fluids and the anodic fluids circulating in separate compartments.

The anode and the cathode are made of a porous material in which the gases can flow.

For example, in the case of the electrolysis of water to produce hydrogen, water vapour circulates at the cathode where hydrogen is generated in gaseous form, and a draining gas circulates at the anode and collects the oxygen generated in gaseous form at the anode.

In high temperature electrolysers, the gaseous mixture introduced is very aggressive for the cathode made for example of Cermet Ni/$ZrO_2$; thus, to limit the level of aggressiveness of the gaseous mixture, hydrogen in gaseous form is introduced into the water vapour before its introduction into the electrolyser in order to maintain the cathode in a reducing medium. This technique is relatively efficient, however it is not applicable at an industrial level, since it requires in particular an additional source of hydrogen. It is aimed to obtain a mixture at the input comprising between 5% and 10% of hydrogen.

Consequently, it is an aim of the present invention to offer an electrochemical reactor suited to an industrial use in which the level of aggressiveness of the environment of the cathodes is reduced.

DESCRIPTION OF THE INVENTION

The above mentioned aim is attained by an electrochemical reactor comprising means suited to recovering a part of the hydrogen produced at the cathodes of the electrochemical reactor to enrich the water vapour circulating at said cathodes to reduce the level of aggressiveness of the medium surrounding the cathodes.

More specifically, the hydrogen that migrates naturally to the anodes adjoining the cathodes through the interconnection plates is recovered. The input of external hydrogen may thus be reduced.

In other words, a compartment is arranged in the interconnection plate to recover a part of the hydrogen generated at the cathode in contact with the collecting plate and to send it to the input of the cathode to reduce the aggressiveness of the medium in which the cathode is situated. The interconnection plates are thus also hydrogen collection plates.

This hydrogen being that which is lost naturally through leaks, its collection thus does not reduce the quantity of hydrogen recovered at the output of the electrolyser.

To do this, the electrochemical reactor uses interconnection plates comprising an internal chamber separated from the cathodic compartment and the anodic compartment by walls, the hydrogen, according to the principle of permeation through a material by difference of concentration, is going to migrate through the wall on the cathode side in the chamber. The hydrogen thus located in the chamber is then collected to be mixed with the gaseous water vapour.

According to another embodiment, water vapour circulates in the interconnection plate and thus is enriched simultaneously with the hydrogen collected in the chamber. This water vapour is then introduced directly into the cathodic compartment in contact with the interconnection plate. The size of the circuit and its complexity are then reduced.

It may also be provided to make a helium type non oxidising gas circulate in the interconnection plate to evacuate the hydrogen, the mixing with the water vapour taking place outside of the plate.

The main object of the present invention is an electrochemical reactor comprising a stack of a plurality of elementary electrolysis cells, each cell being formed of a cathode, an anode and an electrolyte provided between the cathode and the anode, an interconnection plate being interposed between each anode of an elementary cell and a cathode of a following elementary cell, said interconnection plate being in electric contact with the anode and the cathode, and comprising at least one cathodic compartment and at least one anodic compartment for the circulation of fluid at the cathode and the anode respectively, characterised in that the interconnection plate further comprises at least one chamber for collecting at least one gas generated at the cathode separated from the cathodic compartment and the anodic compartment by first and second walls respectively, said first wall at least having a thickness allowing the diffusion of the gas through said first wall from the cathodic compartment to the chamber.

The first wall has advantageously a thickness less than 200 μm, ensuring a good diffusion of the gas through the wall.

The electrochemical reactor according to the present invention is particularly adapted for producing hydrogen by electrolysis of water, water vapour then circulating in the cathode, the gas diffusing through the first wall being hydrogen.

In a particularly advantageous example, the chamber is connected at the input to a source of water vapour and at the output of the cathodic compartment in contact with the first wall, thus the water vapour is enriched simultaneously with the collection of hydrogen.

In another example, the chamber is connected at the input to a source of non oxidising gas, for example helium, and at the output to means for collecting the draining gas and hydrogen.

It may also be provided in an advantageous manner that the second wall is leak tight to gaseous hydrogen in order to avoid leaks of hydrogen from the collecting chamber to the anodic compartment.

The cathodes and anodes are advantageously made of porous material and the electrolyte is solid.

The electrochemical reactor according to the present invention is particularly suited to operating at high temperatures greater than 700° C.

BRIEF DESCRIPTION OF DRAWINGS

The present invention will be better understood on reading the description that follows and by referring to the appended drawings, in which.

DETAILED DESCRIPTION OF SPECIFIC EMBODIMENTS

In the description that follows, an electrolyser of water for producing hydrogen will now be described by way of example. However, the invention applies to any other electrochemical reactor such as a fuel cell.

Figure 1:
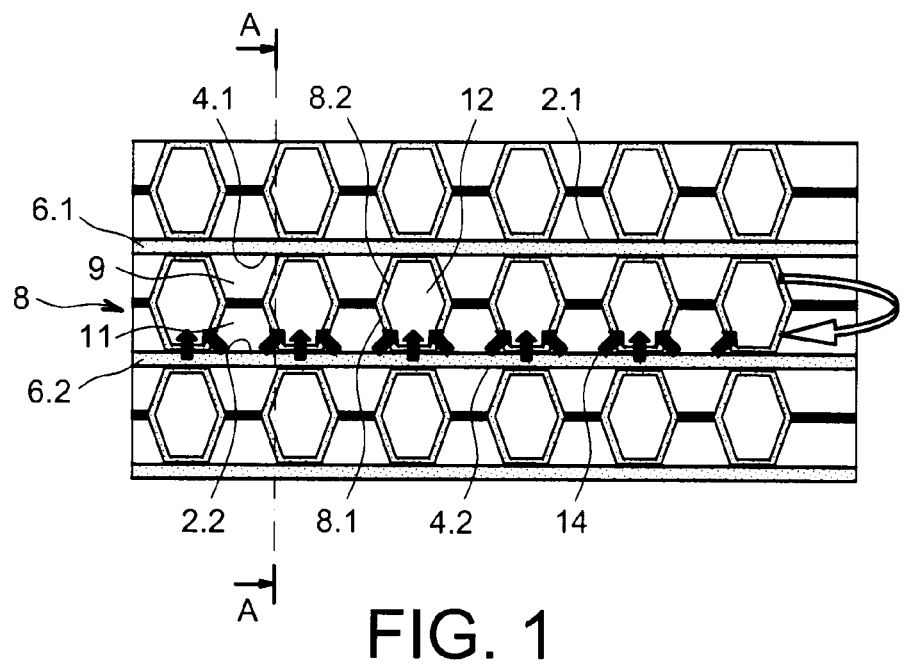
FIG. 1 is a side view of an example of embodiment of an electrolyser according to the present invention.

In FIG. 1 may be seen an example of embodiment of an electrolyser according to the present invention comprising a plurality of stacked elementary electrochemical cells C1, C2, etc.

Each elementary cell comprises an electrolyte provided between a cathode and an anode.

In the remainder of the description, we describe in detail the cells C1 and C2 and their interface.

The cell C1 comprises a cathode 2.1 and an anode 4.1 between which is arranged an electrolyte 6.1, for example solid, generally of 100 μm thickness.

The cell C2 comprises a cathode 2.2 and an anode 4.2, between which is arranged an electrolyte 6.2.

The cathodes 2.1, 2.2 and the anodes 4.1, 4.2 are made of porous material and have for example a thickness of 40 μm.

The anode 4.1 of the cell C1 is electrically connected to the cathode 2.2 of the cell C2 by an interconnection plate 8 coming into contact with the anode 4.1 and the cathode 2.2. Moreover, it enables the electrical supply of the anode 4.1 and the cathode 2.2.

An interconnection plate is interposed between two elementary cells, more precisely between an anode of an elementary cell and the cathode of the adjacent cell. This plate defines with the adjacent anode and the cathode channels for the circulation of fluids. They define anodic compartments 9 dedicated to the circulation of gases at the anode and cathodic compartments 11 dedicated to the circulation of gases at the cathode, this being particularly visible in FIG. 2.

According to the present invention, the interconnection plate 8 comprises at least one chamber for collecting 12 hydrogen in gaseous form generated at the cathode 2.2.

In the example represented, the interconnection plate comprises a plurality of collecting chambers 12 and a plurality of anodic and cathodic compartments. Advantageously, the chambers 12 and the compartments have honeycomb-shaped hexagonal sections, which makes it possible to increase the density of compartments 9, 11 and chambers 12.

For example, the interconnection plate 8 comprises a first sheet 8.1 in contact with the cathode 2.2 and a second sheet 8.2 in contact with the anode 4.1, the sheets 8.1 and 8.2 organising an interior collecting space or chamber 12. The sheets 8.1 and 8.2 also organise with the cathode 2.2 and the anode 4.1 the cathodic 11 and anodic 9 compartments respectively.

The first sheet 8.1 in contact with the cathode 2.2 is provided sufficiently thin to enable a good diffusion of hydrogen through the sheet 8.1 from the cathode side 2.2 to the space 12. The thickness of the sheet 8.2 is advantageously chosen in such a way that it limits the diffusion of hydrogen from the chamber 12 to the anode 4.1.

The thickness of the sheet 8.1 is for example less than 1 mm and advantageously less than 200 μm and, in an even more advantageous manner, of the order of 100 μm.

The chamber 12 is connected to an input (not represented) of gaseous fluid and the other to an output (not represented) to evacuate the hydrogen.

We will now explain how the present invention works.

The present invention uses the principle of permeation through a material, particularly a metal, by concentration difference.

In the case of the present invention, the hydrogen concentration at the cathode is much higher than that in the volume 12 of the interconnection plate 8, consequently the hydrogen in gaseous form produced at the cathode 2.2 is going to diffuse naturally through the first sheet 8.1, the thickness of which is such that it enables such a diffusion. The chamber 12 is thus going to become richer in hydrogen in gaseous form. This diffusion is represented by the arrows 14.

It should be noted that in the case of industrial electrolysers, the surface of the interconnection plates is of the order of several hundreds of $cm^2$ and that their thickness is reduced to limit the size, consequently the phenomenon of diffusion will be even more present. The present invention is thus particularly advantageous in this type of large sized electrolyser.

Simultaneously, since the hydrogen concentration at the anode 4.1 is much lower than that in the chamber 12, this is also going to diffuse through the second sheet 8.2 to recombine with oxygen to form the vapour. This phenomenon of diffusion to the anode 4.1 is however reduced, compared to existing electrolysers, since the partial pressure of hydrogen in the chamber 12 is less than that at the cathode 2.2.

Water vapour may then be provided to circulate directly in the chamber 12. To do this, the chamber 12 is connected to the water supply, the water vapour is thus enriched directly with hydrogen within the electrolyser, and is sent directly into the cathode 2.2. The circuit for circulating the water vapour is thus reduced. The circulation of water vapour is represented by the arrows 16 for the circulation in the interconnection plate 8 and by the arrows 18 for the circulation in the cathode 2.2.

It is aimed to obtain a water vapour comprising 5% to 10% of hydrogen in order to obtain a sufficiently reducing medium for the cathode. If this percentage is obtained directly by diffusion of hydrogen through the first sheet 8.1, the water vapour introduced into the chamber 12 may be water vapour not enriched beforehand. If, on the other hand, the percentage of hydrogen is less than that desired, already enriched water vapour may be introduced. The quantity of hydrogen to supply beforehand is then reduced, compared to the techniques of the prior art.

A gas may also be provided to circulate in the chamber 12 so as to drain the hydrogen diffusing in the chamber 12. This gas is advantageously non oxidising, for example helium. This hydrogen enriched gas is then either mixed directly with the water vapour at the input of the cathodic compartments, or collected to separate the hydrogen from the draining gas.

The interconnection plate 8 may also be formed by using a solid plate in which is machined a network of channels, thin plates being arranged on either side of the solid plate, coming into contact with the cathode and the anode. The plate in contact with the cathode is provided sufficiently thin to enable the diffusion of hydrogen in the direction of the channels.

It is preferable to make a fluid circulate in the chamber 12 for collecting the hydrogen and not to collect pure hydrogen at the output of the chamber 12, which would be harmful for the diffusion. Indeed, the concentration of hydrogen in the chamber 12 then would become close to that at the cathode, limiting the phenomenon of diffusion.

A draining gas may also circulate in the anode in order to collect the oxygen generated therein.

Advantageously, it is provided that each interconnection plate 8 comprises at least one chamber for collecting hydrogen by diffusion, in order to be able to enrich the water vapour circulating in each cathodic compartment by the hydrogen recovered in the adjacent plate.

The present invention thus has the advantage of using the leaks of hydrogen taking place naturally from the cathodic compartments to the anodic compartments through the interconnection plate 8, in order to increase the lifetime of the cathode.

Moreover, it makes it possible to use the hydrogen produced in the electrolyser avoiding resorting to an external source or specific means for using that produced in the electrolyser, particularly means of cooling, compressing to the supply pressure, which are energy consuming and which are costly and bulky. The invention thus makes it possible to reduce, even to do away with, the recirculation circuit.

Moreover, since the hydrogen contained in the electrolyser is already at the temperature of the stack of elementary cells, it is not necessary to heat it to avoid thermal shocks.

The electrolyser according to the present invention is thus more compact, easier to produce and thus of reduced cost price and is, moreover, less energy consuming than electrolysers of the prior art.

Figure 2:
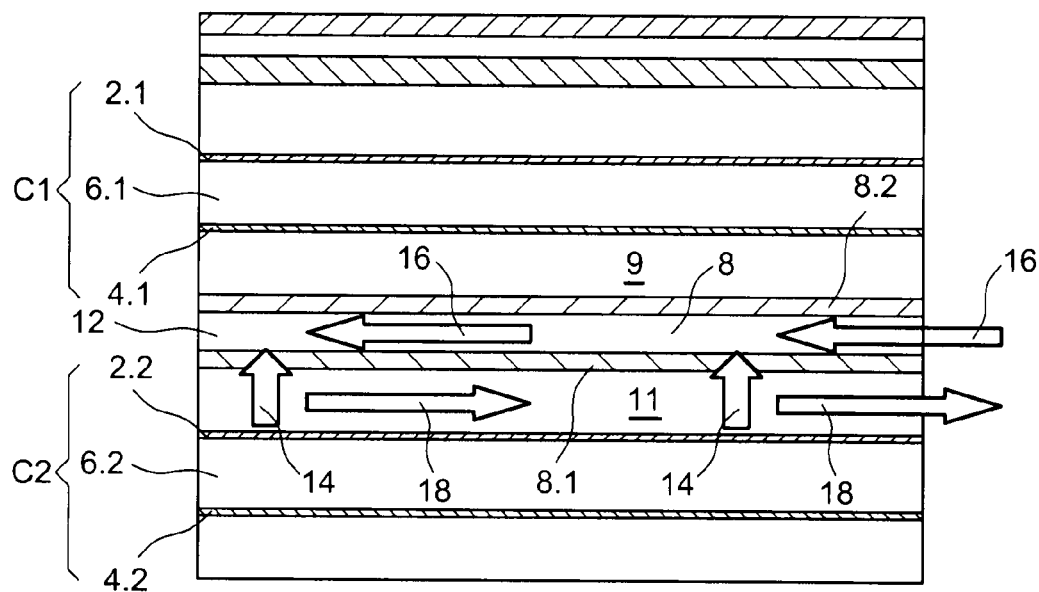
FIG. 2 is a sectional view of the electrolyser of FIG. 1 along a plane A-A.
Figure 3:
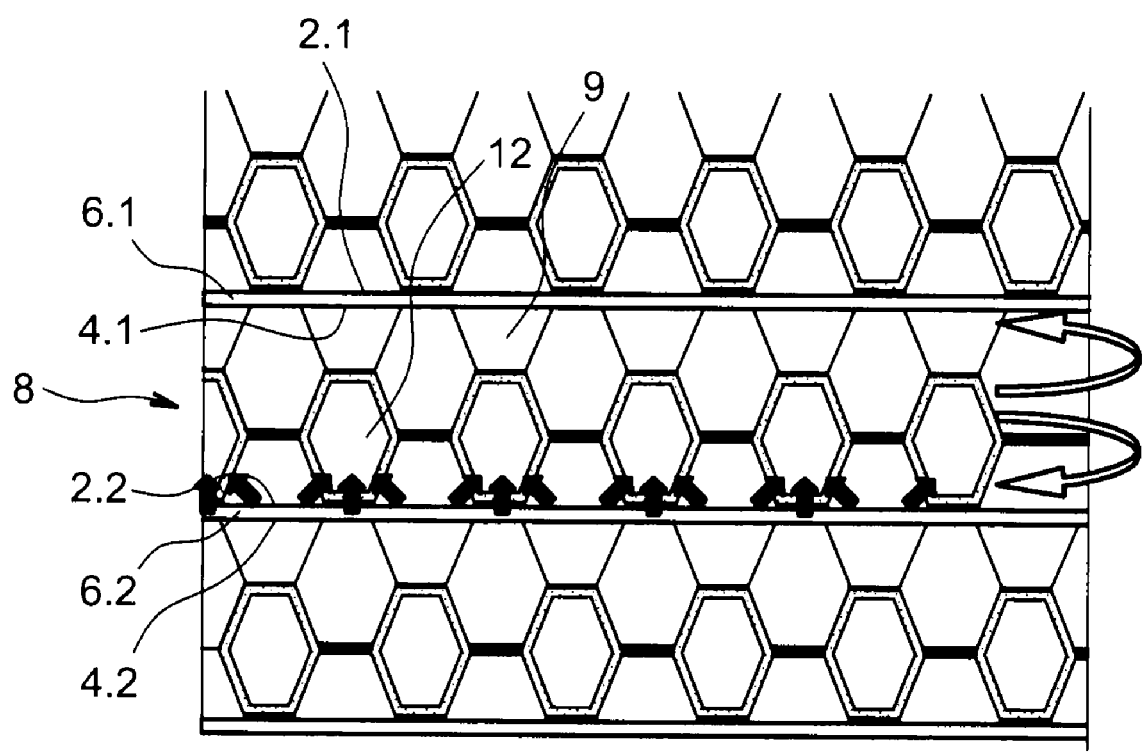
FIG. 3 is a frontal view of another example of embodiment of an electrolyser according to the present invention.

In FIG. 3 may be seen an alternative embodiment of the electrolyser of FIGS. 1 and 2, wherein channels 20 are provided for the circulation of the draining gas before its injection onto the anodes, this prior circulation in the electrolyser makes it possible to heat the gas.

By way of example, we will calculate the molar flow of hydrogen in mol·m$^{-2}$·s$^{-1}$ through a sheet of 200 μm thickness.

$$\Phi_\infty = \frac{P_e\sqrt{P_{H_2}}}{eVm},$$

wherein $\Phi_\infty$ is the molar flow of hydrogen in mol·m$^{-2}$·s$^{-1}$;
$P_e$ is the permeation coefficient in m$^3$·m·m$^{-2}$P$^{-1/2}$;
$P_{H2}$ is the partial pressure of hydrogen in Pa;
E is the thickness of the sheet 8.1 in m;
$V_m$ is the molar volume: 22.4.10$^{-3}$·m$^3$·mol$^{-1}$.

A ferritic material is chosen for the sheet, in this case with a coefficient obtained experimentally:

$$P_e = 5.50 \times 10^{-8} \exp\left(-\frac{41800}{RT}\right)$$

Where R is the perfect gas constant: 8.31 J·mol$^{-1}$·K$^{-1}$ and T the temperature in K.

Thus, for a plate of 200 μm thickness, at a temperature of 800° C. and a partial pressure of hydrogen of 10$^5$ Pa, one obtains $\Phi_\infty$=5.58.10$^{-2}$ mol$^{-1}$·m$^{-2}$·s$^1$, which corresponds to several percent of the flow of hydrogen produced.

The dimensions of the circuits of the chamber 12 formed in the interconnection plate are of the same order of magnitude as those of the cathodic compartment, since it is the same quantity of fluid at a substantially equal rate that circulates in the interconnection plate and the cathodic compartment.

The collection of hydrogen diffusing through the interconnection plate has been described, but any collection of hydrogen by diffusion at any point of the electrolyser does not go beyond the scope of the present invention.

The walls of the interconnection plate are for example made from Haynes® 230, Inconel® 600 or Crofer® 22APU.

The invention claimed is:

1. An electrochemical reactor comprising:
   a stack of a plurality of elementary electrolysis cells, each cell including a cathode, an anode, and an electrolyte provided between the cathode and the anode;
   an interconnection plate interposed between each anode of an elementary cell and a cathode of a following elementary cell, the interconnection plate being in electric contact with the anode and the cathode of the following elementary cell;
   at least one cathodic compartment and at least one anodic compartment for circulation of fluid to the cathode and the anode respectively; and
   the interconnection plate comprises at least one chamber for collecting at least one gas generated at the cathode of the following elementary cell separated from the cathodic compartment and the anodic compartment by first and second walls respectively, the first wall at least having a thickness allowing diffusion of the gas through the first wall from the cathodic compartment to the chamber.

2. The electrochemical reactor according to claim 1, wherein the first wall has a thickness less than 200 μm.

3. The electrochemical reactor according to claim 1, for producing hydrogen by electrolysis of water, water vapour circulating in the cathode, the gas diffusing through the first wall being hydrogen.

4. The electrochemical reactor according to claim 3, wherein the chamber is connected at an input to a source of water vapour and at an output to the cathodic compartment in contact with the first wall.

5. The electrochemical reactor according to claim 3, wherein the chamber is connected at an input to a source of non-oxidizing draining gas, or to helium, and at an output to means for collecting the draining gas and hydrogen.

6. The electrochemical reactor according to claim 1, wherein the second wall is leak tight to gaseous hydrogen.

7. The electrochemical reactor according to claim 1, wherein cathodes and anodes of the stack of a plurality of elementary electrolysis cells are made of porous material and the electrolyte is solid.

8. The electrochemical reactor according to claim 1, wherein the electrochemical reactor operates at high temperatures above 700° C.

* * * * *